US006173964B1

United States Patent
Bell et al.

(10) Patent No.: US 6,173,964 B1
(45) Date of Patent: Jan. 16, 2001

(54) SEAL ASSEMBLY WITH BACKUP ELEMENTS HAVING COIL SPRINGS POSITIONED THEREIN

(75) Inventors: Merle L. Bell, Willis, TX (US); Ian Gravill, Aberdeen (GB)

(73) Assignee: Greene, Tweed of Delaware, Inc., Wilmington, DE (US)

(*) Notice: Under 35 U.S.C. 154(b), the term of this patent shall be extended for 0 days.

(21) Appl. No.: 09/111,322

(22) Filed: Jul. 7, 1998

(51) Int. Cl.[7] ..................................................... F16J 15/32
(52) U.S. Cl. ......................... 277/584; 277/589; 277/572; 277/554
(58) Field of Search .................................. 277/589, 584, 277/572, 554, 436, 437, 438

(56) References Cited

U.S. PATENT DOCUMENTS

| | | |
|---|---|---|
| 2,767,795 | 10/1956 | Bush . |
| 4,074,908 | 2/1978 | Spencer . |
| 4,141,563 | 2/1979 | Wu . |
| 4,379,558 | 4/1983 | Pippert . |
| 4,453,723 | 6/1984 | Greenwald . |
| 4,493,373 | 1/1985 | Jackson . |
| 4,593,914 | 6/1986 | Johnson . |
| 5,014,603 | 5/1991 | Navarette et al. . |
| 5,088,744 | 2/1992 | Oseman . |
| 5,306,022 | 4/1994 | Bourque . |
| 5,524,905 | 6/1996 | Thoman et al. . |
| 5,603,511 | 2/1997 | Keyser, Jr. et al. . |
| 5,791,657 | * 8/1998 | Cain et al. ........................... 277/554 |
| 5,879,010 | * 3/1999 | Nilkanth et al. ..................... 277/545 |

* cited by examiner

Primary Examiner—Anthony Knight
Assistant Examiner—Enoch Peavey
(74) Attorney, Agent, or Firm—Akin, Gump, Strauss, Hauer & Feld, L.L.P.

(57) ABSTRACT

A seal assembly seals a cylindrical clearance space between first and second coaxial members, and is installed in a coaxial annular groove in the first member. The groove has a mouth, first and second side walls, and a base wall extending therebetween. An elastomeric annular seal element has in toroidal cross-section an axial leg and a radial leg. The axial leg extends axially along the groove base wall and includes axial end portions and a mid-portion therebetween. The radial leg extends radially from the mid-portion toward and through the groove mouth, and has opposing side surfaces and a contact surface therebetween. The contact surface is outside the groove and sealingly contacts the second member. A non-elastomeric annular back-up element is positioned adjacent one of the seal element radial leg side surfaces, and prevents extrusion of the seal element when pressure is applied adjacent the other side surface. The back-up element defines an annular channel that opens away from the adjacent seal clement side surface and toward the respective groove side wall. An annular biasing element is positioned in the channel and provides a radial force on the seal element and the back-up element toward the groove base wall, and prevents the back-up element from becoming displaced with respect to the seal element when pressure is applied to the seal assembly.

5 Claims, 2 Drawing Sheets

SEAL ASSEMBLY WITH BACKUP ELEMENTS HAVING COIL SPRINGS POSITIONED THEREIN

FIELD OF THE INVENTION

The present invention relates to a seal assembly. More particularly, the present invention relates to a seal assembly for sealing a clearance space between first and second relatively displaceable surfaces, where such seal assembly has particular applicability to down-hole oil field applications.

BACKGROUND OF THE INVENTION

The use of seal assemblies in down-hole oil field applications is known. In one particular application, an oil drilling completion, and/or measurement tool is run down into an oil well lined with casing, and the equipment includes an annular groove within which an annular seal assembly is positioned to seal the space between the inner diameter of the casing and the outer diameter of the equipment. In the prior art, such a seal assembly typically comprised an annular seal element having annular coil springs molded into the two corners of the outer diameter (in toroidal cross-section), where the springs themselves act to prevent extrusion of the seal element in the region of such outer diameter corners.

Such a prior art seal assembly was found to work well under lower pressures and lower temperatures, for example up to 5,000 psi and 250° F. However, it is now typical in down-hole oil fields apparatus to have higher pressures and higher temperatures, on the order of 20,000 psi and 450° F., respectively. As one skilled in the art will appreciate, at such higher temperatures and pressures, the seal element of such prior art seal assembly, which is typically a rubber-like material, tends to flow and extrude through the springs, thereby resulting in a loss of seal element material and eventual seal failure.

Accordingly, it has been proposed to employ as a seal assembly in the aforementioned down-hole oil field application a T-shaped seal element (in toroidal cross-section) and a pair of annular back-up or anti-extrusion elements, one on each axial side of the T-shaped seal element. Such proposed T-seal seal assembly is known in the prior art and has been used in one form or another in other applications such as hydraulic or pneumatic systems for both rod- and piston-type seals. Generally, each back-up element is positioned adjacent the T-shaped element and the contact point thereof such that when higher pressure is applied to the opposite axial side of the T-shaped seal element, the respective back-up element prevents extrusion of the T-shaped seal element, in the area of such contact point.

However, it has been found that such prior art T-seal seal assemblies do not work well in the previously described high temperature and high pressure environment of a down-hole oil field application. In particular, it has been found that one or both of the back-up elements tends to become displaced from the T-shaped seal element, thereby failing to provide the desired back-up function such that the T-ring seal assembly eventually fails. Accordingly, a need exists for a T-ring seal assembly that works well under high pressure and high temperature, whereby the back-up elements do not become displaced with regard to the T-shaped seal element.

BRIEF SUMMARY OF THE INVENTION

To satisfy the aforementioned need, the present invention provides a seal assembly for sealing a generally cylindrical clearance space between first and second generally coaxial members. The seal assembly is for installation in a generally coaxial annular groove in the first member. The groove has a mouth, first and second side walls, and a base wall extending generally axially between the side walls.

The seal assembly comprises a generally annular seal element formed from an elastomeric material, a generally annular anti-extrusion back-up element formed from a non-elastomeric material, and a generally annular biasing element. The seal element has in toroidal cross-section a generally axially extending leg and a generally radially extending leg. The axial leg extends generally axially along the base wall of the groove, and includes generally axial end portions and a mid-portion between the end portions. The radial leg extends generally radially from the mid-portion of the axial leg and toward and through the mouth of the groove. The radial leg has opposing generally radially extending side surfaces and a contact surface between the side surfaces. The contact surface is positioned outside the mouth of the groove and sealingly contacts the second member.

The back-up element is positioned adjacent one of the side surfaces of the radial leg of the seal element. The back-up element functions to prevent extrusion of the seal element when pressure is applied adjacent the other side surface. The back-up element defines a generally annular channel that opens away from the adjacent side surface of the seal element and toward the respective side wall of the groove. The biasing element is positioned in the channel of the back-up element such that the biasing element provides a generally radial force on at least a portion of the seal element and the back-up element toward the base wall of the groove. The biasing element prevents the back-up element from becoming displaced with respect to the seal element when pressure is applied to the seal assembly.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements, configurations, and instrumentalities shown. In the drawings.

DETAILED DESCRIPTION OF PREFERRED EMBODIMENTS

Figure 1:
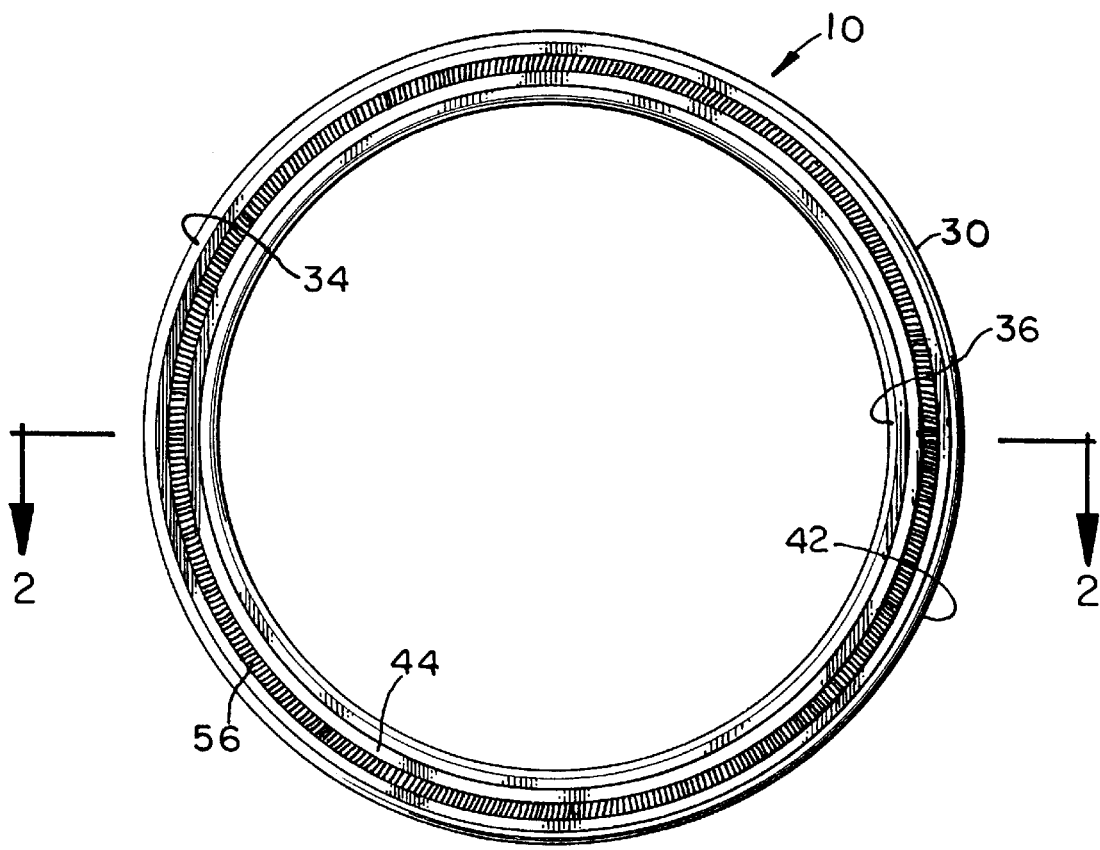
FIG. 1 is an elevational view of a seal assembly in accordance with a preferred embodiment of the present invention.

Certain terminology is used in the following description for convenience only and is not limiting. The words "right", "left", "lower", and "upper" designate directions in the drawings to which reference is made. The words "inwardly"

and "outwardly" refer to directions toward and away from, respectively, the geometric center of the element reference. The terminology includes the words above specifically mentioned, derivatives thereof, and words of similar import.

Figure 2:
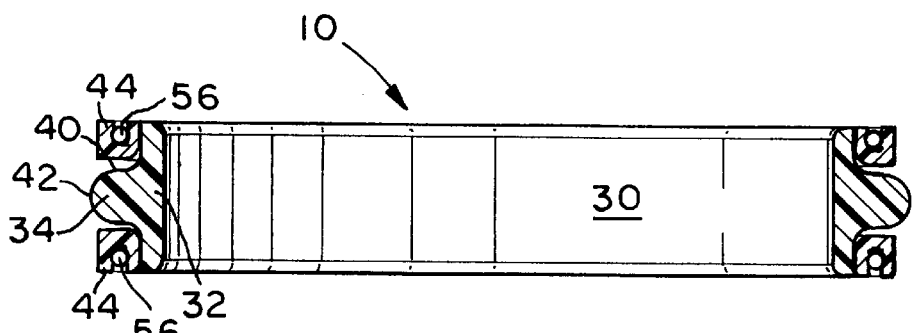
FIG. 2 is a cross-sectional view taken along line 2—2 in FIG. 1.
Figure 3:
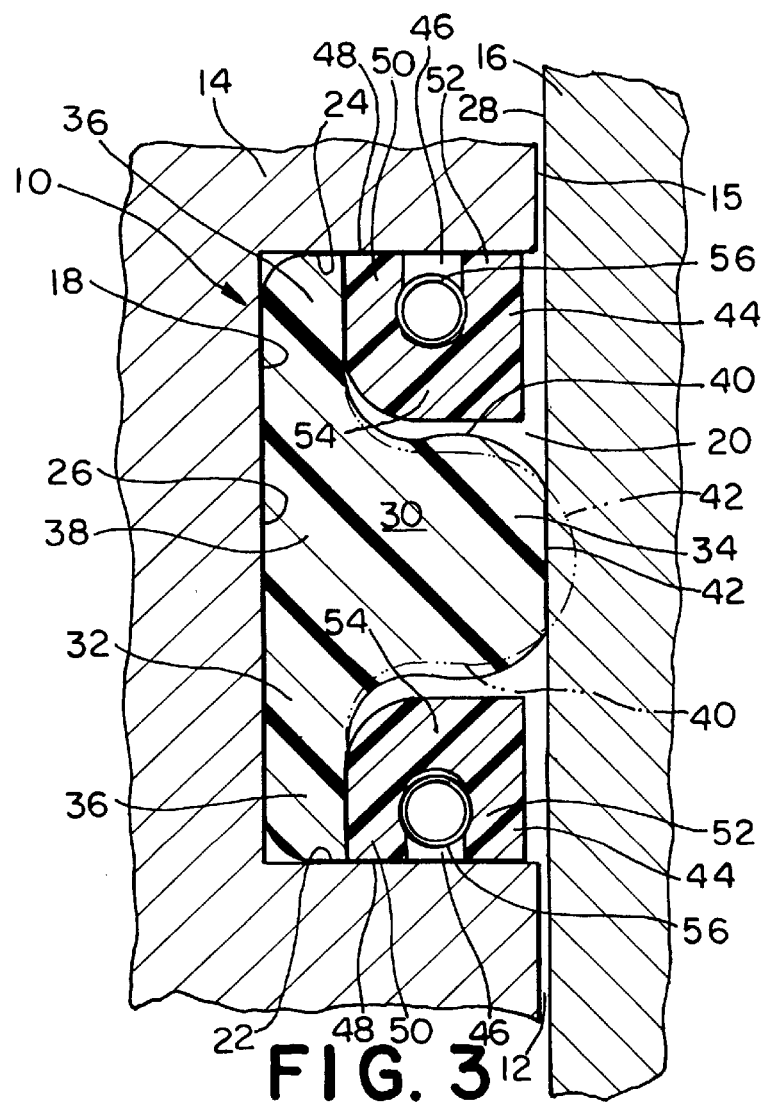
FIG. 3 is an enlarged toroidal cross-sectional view of the seal assembly shown in FIG. 1 positioned between first and second members.

Referring now to the drawings in detail, wherein like numerals are used to indicate like elements throughout, there is shown in FIGS. 1, 2 and 3 a seal assembly, generally designated 10, in accordance with a preferred embodiment of the present invention. As shown in FIG. 3, the seal assembly 10 is employed to seal a clearance space 12 between first and second members 14, 16, respectively. As should be understood, the first and second members 14, 16 are generally coaxial, and the clearance space 12 is generally cylindrical.

With regard to a down-hole oil field application, the second member 16 would typically be the casing hanger mentioned above, and the first member 14 would typically be a drilling or measuring piece of equipment within the casing hanger. However, and importantly, one skilled in the art will recognize that the seal assembly 10 may be employed in any of a number of applications other than down-hole oil field related applications, all without departing from the spirit and scope of the present invention. As but one example, the seal assembly 10 may be employed in an aircraft landing gear piston-and-cylinder assembly.

Still referring to FIG. 3, it is seen in toroidal cross-section that the first member 14 has a first surface 15 and a generally annular coaxial groove 18 therein. The groove 18 has a mouth 20, first and second sidewalls 22, 24 which extend generally radially, and a base wall 26 which extends generally axially between sidewalls 22, 24. Although the groove 18 is shown as being generally rectangular in toroidal cross-section, one skilled in the art will appreciate that other groove geometries may be employed, based upon specific application requirements, without departing from the spirit and scope of the present invention. Moreover, one skilled in the art will appreciate that such other applications may require that the groove 18 have certain nuances, again without departing from the spirit and scope of the present invention. For example, such nuances may include transition areas between adjacent walls and surfaces, waved walls or surfaces, textured walls or surfaces, etc.

The second member 16 includes a second surface 28 which overlays the groove 18. As should now be understood, the first and second members 14, 16 are preferably axially displaceable with respect to each other.

As seen in FIGS. 1, 2, and 3, the seal assembly 10 includes a flexible generally annular seal element 30 which is generally T-shaped in toroidal cross-section and which is formed from an elastomeric material. In the high temperature and high pressure down-hole oil field environment mentioned above, it is preferable that the seal element be formed from an elastomeric material such as NBR (nitryl rubber), although one skilled in the art will appreciate that other materials may be employed without departing from the spirit and scope of the present invention. Such other materials, depending on the specific application, include but are not limited to HNBR, FKM, FXM, FFKM, and EPDM.

Preferably, the seal element 30 has, in toroidal cross-section, a generally axially extending leg 32 and a generally radially extending leg 34. More particularly, the axial leg 32 extends generally axially along the base wall 26 of the groove 18, and includes generally axial end portions 36 and a mid-portion 38 extending between the end portions 36; and the radial leg extends generally radially from the mid-portion 38 of the axial leg 32. As seen, the radial leg 34 has opposing generally radially extending side surfaces 40 and a contact surface 42 between the side surface 40. When the seal element 30 is installed within the groove 18 (FIG.3), the radial leg 34 extends toward and through the mouth 20 of the groove 18.

As seen in FIGS. 2 and 3 (dash lines in FIG. 3), prior to insertion within the groove 18, the radial leg 34 of the seal element 30 extends "beyond and into" the second surface 28 of the second member 16. Accordingly, upon insertion into the groove 18 and upon causing the second surface 28 of the second member 16 to overly the groove 18, the contact surface 42 is positioned outside the mouth 20 of the groove 18 and sealingly contacts the second member 16 at the second surface 28 thereof. Accordingly, the radial leg 34 becomes "squashed down" (as shown in FIG. 3).

As best seen in FIGS. 2 and 3, the seal element 20 in a relaxed form has a particular geometry as shown. Such geometry includes a relatively arcual contact surface 42 on the radial leg 34 and rather pronounced transition surfaces between the side surfaces 40 of the radial leg 34 and the axial leg 32, among other things. However, and importantly, one skilled in the art will recognize that the basis of the present invention does not rely on any particular geometry for the seal element 30, other than that the seal element 30 be generally T-shaped. Accordingly, one skilled in the art will appreciate that any specific geometry may be employed for the T-shaped seal element 30 without departing from the spirit and scope of the present invention. As but one example (other than the example shown in FIGS. 1, 2, and 3), the T-shaped seal element 30 may have the geometry shown in U.S. Pat. No. 5,524,905.

As seen in FIGS. 1, 2 and 3, the seal assembly 10 also has a generally complementary, generally annular anti-extrusion back-up element 44 which is formed from a non-elastomeric material. As seen, the back-up element 44 is positioned within the groove 18 juxtaposed to a respective side surface 40 of the radial leg 34 of the seal element 20. As was discussed above, the back-up element 44 is positioned adjacent the seal element 30 and the contact surface 42 thereof such that when higher pressure is applied to the opposite side surface 40 and the opposite axial side of the seal element 30, the back-up element 44 prevents extrusion of the seal element 30 in the area of such contact surface 42 and along the second surface 28 of the second member 16. Preferably, the back-up element 44 is formed from a non-elastomeric material such as a nylon material, a Teflon material, a PEEK (polyethylethylketone) material, a polyamide material, among other things. However, one skilled in the art will appreciate that any of a number of other non-elastomeric materials may be employed to form the back-up element 44, all without departing from the spirit and scope of the present invention, as long as the employed non-elastomeric material can provide the aforementioned back-up function at the temperature and pressure expected to be experienced by the seal assembly 10.

Preferably, and as best seen in FIG. 3, the back-up element 44 defines a generally annular channel 46, where the claim 46 opens away from the adjacent side surface 40 of the radial leg 34 of the seal element 20, and toward the respective sidewall 22, 24 of the groove 18. As should be understood, then, the channel 46 opens toward an outer generally radial surface 48 of the back-up element 44, and such opening at the surface 48 is generally annular.

More preferably, the back-up element 44 has, in toroidal cross-section, first and second axial portions 50, 52 and a generally radial portion 54, where the first and second axial portions 50, 52 and the radial portion 54 define the channel 46. In particular, and as best seen in FIG. 3, when the back-up element 44 and the seal element 30 are installed within the groove 18, the first axial portion 50 extends generally axially adjacent the respective axial end portion 36 of the axial leg 32 of the seal element 20. Accordingly, the first axial portion 50 extends from the respective sidewall 22, 24 of the groove 18 toward the respective side surface 40 of the radial leg 34 of the seal element 20. The radial portion 54 then extends generally radially adjacent the respective side surface 40 of the radial leg 34 of the seal element 20 from the first axial portion 50 toward the mouth 20 of the groove 18. Finally, the second axial portion 52 extends generally axially adjacent the mouth 20 of the groove 18 from the radial portion 54 toward the respective sidewall 22, 24 of the groove 18.

Although the back-up element 44 shown has a particular geometry, the present invention does not require that the back-up element 44 have any particular geometry other than that the back-up element have a geometry necessary to perform the back-up function with the seal element 30, and that the back-up element 44 define the channel 46 as was discussed above (i.e., that the channel 46 open toward the outer radial surface 48 of the back-up element 44). Accordingly, one skilled in the art will recognize that the back-up element 44 may have any of several particular geometries, depending upon the particular application within which the seal assembly 10 is employed, all without departing from the spirit and scope of the present invention.

One skilled in the art will also recognize that the seal assembly 10 may include one or more additional axially oriented back-up elements (not shown) on the same axial side of the seal element 30, in a manner akin to that shown in U.S. Pat. No. 5,524,905, without departing from the spirit and scope of the present invention. Presumably, although not necessarily, in such an embodiment, the axially outer-most back-up element would be the back-up element 44 having the channel 46.

To prevent the back-up element 44 from becoming displaced with respect to the seal element 30 when pressure is applied thereto, it is preferable that the seal assembly 10 also have a generally annular biasing element 56 positioned in the channel 46 of the back-up element 44. As should now be understood, it is preferable that the channel 46 be particularly and suitably sized to securely receive the biasing element 56. When so received, the biasing element 56 preferably provides a generally radial force on at least a portion of the seal element 30 and the back-up element 44 toward the base wall 26 of the groove 18. As best seen in FIG. 3, such radial force is most directly applied to the first axial portion 50 of the back-up element 44 and to the axial end portion 36 of the axial leg 32 of the seal element 30. With the biasing element 56, the back-up element 44 is prevented from "washing out" when pressure is applied to the seal assembly 10.

Preferably, the biasing element 56 is a garter spring assembly constructed of wound steel such elgiloy, inconel, stainless steel or the like. Also preferably, the garter spring assembly has two ends, one end being securely fitted within the other end. However, one skilled in the art will recognize that, depending upon the pressures and temperatures to be encountered by the seal assembly 10, other biasing elements may be employed, such as an elastomeric ring or the like, without departing from the spirit and scope of the present invention.

Figure 2A:
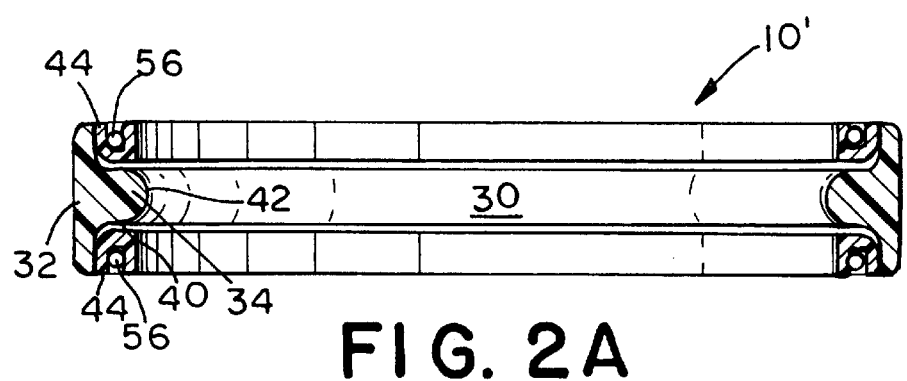
FIG. 2A is a cross-sectional view corresponding to a portion of the view shown in FIG. 2, and shows an alternate embodiment of the seal assembly shown in FIG. 1.

Preferably, and as shown in FIGS. 1, 2, and 3, the first member 14 having the groove 18 is positioned within the second member 16 and the radial force provided by the biasing element 56 is a radially inward or compression force. However, one skilled in the art will recognize that the second member 16 may alternatively be positioned within the first member 14 having the groove 18, and the radial force provided by the biasing element 56 would be a radially outward or tension force, without departing from the spirit and scope of the present invention. In such a situation, the seal assembly 10' shown in FIG. 2A would be employed. As seen, the seal assembly 10' is substantially similar to the seal assembly 10, except that the contact surface 42 of the seal assembly 10' is a radially innermost surface, while the contact surface 42 of the seal assembly 10 is in contrast a radially outermost surface.

As is to be understood, the seal assembly 10 (or 10') may experience pressure applied adjacent either of the side surfaces 40 of the radial leg 34 of the seal element 30. Accordingly, and as best shown in FIGS. 2 and 3, it is preferable that complementary back-up elements 44 be positioned adjacent each of the side surfaces 40. Likewise, it is preferable that a biasing element 56 be positioned within each of the back-up elements 44, as shown.

To assemble the seal assembly 10 (or 10') within the groove 18, the seal element 30 is preferably positioned within the groove 18 first, by appropriate means known to one skilled in the art. Thereafter, each back-up element 44 is inserted to be complementarily matingly positioned adjacent the seal element 30, with the respective biasing element 56 positioned within the channel 46 of the back-up element 44 prior to such insertion. Preferably, each back-up element 44 contains a scarf cut (not shown) to allow for expansion (or contraction) of the back-up element 44 prior to being positioned within the groove 18. As should be understood and as seen in FIG. 3, once each of the back-up element 44/biasing element 56 combinations is installed within the groove 18, the biasing element 56 effectively prevents the respective back-up element 44 from being displaced with respect to the seal element 30, and the biasing element 56 is effectively prevented from escaping from the channel 46 within the back-up element 44 because of the adjacent side wall 22 or 24.

With the seal assembly 10 (or 10') of the present invention, and as should now be understood, each back-up element 44 prevents extrusion of the seal element 30 when high pressure is applied to the opposing side surface 40 of the seal element 30. At the same time, the biasing element 56 within the channel 46 of each back-up element 44 prevents such back-up element 44 from becoming displaced with respect to the seal element 30, thus preventing the back-up element 44 from being "washed out" of the groove 18.

It will be appreciated by those skilled in the art that changes could be made to the embodiments described above without departing from the broad inventive concepts thereof. Moreover, it is to be appreciated by those skilled in the art that the seal assembly 10 (or 10') may be employed in any application where an annular seal element requires a back-up element, and the back-up element must not be allowed to become displaced with respect to the seal element. It is understood, therefore, that this invention is not limited to the particular embodiments disclosed, but it is intended to cover modifications within the spirit and scope of the present invention as defined by the appended claims.

What is claimed is:

1. A seal assembly for sealing a generally cylindrical clearance space between first and second generally coaxial members, the seal assembly for installation in a generally coaxial annular groove in the first member, the groove having a mouth, first and second side walls, and a base wall extending generally axially between the side walls, the seal assembly comprising:

a generally annular seal element formed from an elastomeric material and having, in toroidal cross-section:
  a generally axially extending leg for extending generally axially along the base wall of the groove, the axial leg including generally axial end portions and a mid-portion between the end portions;
  a generally radially extending leg extending generally radially from the mid-portion of the axial leg, the radial leg for extending toward and through the mouth of the groove, the radial leg having opposing generally radially extending side surfaces and a contact surface between the side surfaces, the contact surface for being positioned outside the mouth of the groove and for sealingly contacting the second member;
a generally annular anti-extrusion back-up element formed from a non-elastomeric material, the back-up element for being positioned adjacent one of the side surfaces of the radial leg of the seal element, the back-up element functioning to prevent extrusion of the seal element when pressure is applied adjacent the other side surface, the back-up element defining a generally annular channel, the channel opening away from the adjacent side surface of the seal element and toward the respective side wall of the groove; and
a generally annular biasing element for being positioned in the channel of the back-up element such that the biasing element provides a generally radial force on at least a portion of the seal element and the back-up element toward the base wall of the groove, the biasing element for preventing the back-up element from becoming displaced with respect to the seal element when pressure is applied to the seal assembly.

2. The seal assembly of claim 1 comprising:

a pair of generally annular anti-extrusion back-up elements each formed from a non-elastomeric material, one of the pair of back-up elements for being positioned adjacent each of the side surfaces of the radial leg of the seal element, each back-up element functioning to prevent extrusion of the seal element when pressure is applied adjacent the opposing side surface, each back-up element defining a generally annular channel; and a pair of generally annular biasing elements, one of the pair of biasing elements for being positioned in the channel of each back-up element such that each biasing element provides a generally radial force on at least a portion of the seal element and the respective back-up element toward the base wall of the groove, each biasing element for preventing the respective back-up element from becoming displaced with respect to the seal element when pressure is applied to the seal assembly.

3. The seal assembly of claim 1 wherein the back-up element has, in toroidal cross-section:

a first generally axial portion for extending generally axially adjacent the respective axial end portion of the axial leg of the seal element from the respective side wall of the groove toward the respective side surface of the radial leg of the seal element;

a generally radial portion for extending generally radially adjacent the respective side surface of the radial leg of the seal element from the first axial portion toward the mouth of the groove; and a second generally axial portion for extending generally axially from the radial portion toward the respective side wall of the groove;

wherein the first and second axial portions and the radial portion define the channel.

4. The seal assembly of claim 1 wherein the first member is positioned within the second member and the radial force provided by the biasing element is a radially inward force.

5. The seal assembly of claim 1 wherein the second member is positioned within the first member and the radial force provided by the biasing element is a radially outward force.

* * * * *